W. E. Leonard,

Breast Collar.

No. 110,377. Patented Dec. 20. 1870.

Witnesses
Edmund Masson
H. K. Lawton

Inventor.
Wm E. Leonard.
By his Attorney,
Horatio King

United States Patent Office.

WILLIAM E. LEONARD, OF BOSTON, MASSACHUSETTS.

Letters Patent No. 110,377, dated December 20, 1870.

IMPROVEMENT IN BREAST-COLLARS FOR HORSES.

The Schedule referred to in these Letters Patent and making part of the same.

I, WILLIAM E. LEONARD, of the city of Boston and State of Massachusetts, have invented certain Improvements in Breast-Collars for Horses, of which the following is a specifiation.

I wish it first distinctly understood that I do not confine myself, in the construction of my improved collar, to the shape or design as presented by the accompanying drawing, but give it merely as an illustration, as my improvement can be applied to collars of any shape or design.

Figure 1:
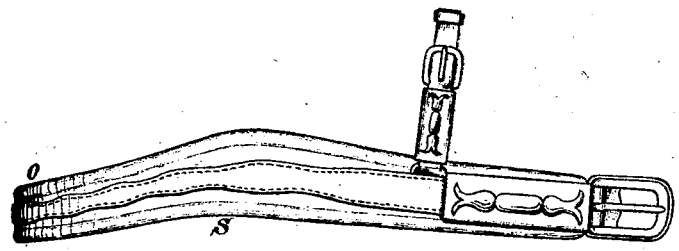
Figure 1 is a side view.
Figure 2:
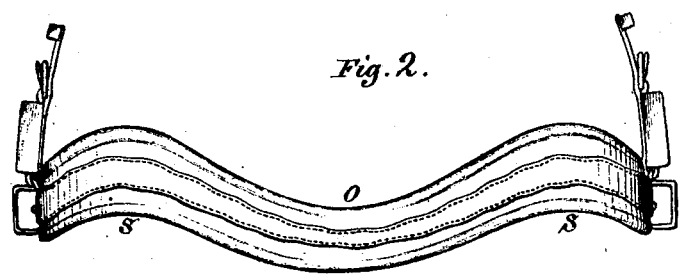
Figure 2 is a front view.
Figure 3:
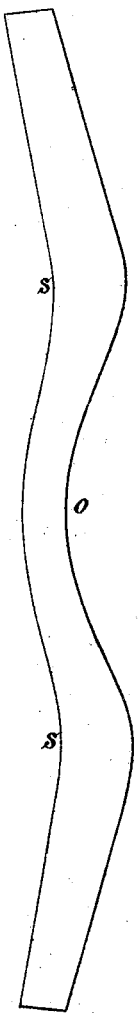
Figure 3 is a view of the patent-leather stay.

I am well aware that the breast-collars in present use do not, when new, cause much inconvenience to the horse, being stiff and in a measure unyielding; but in view of the fact that after frequent use they stretch, sag down, and press against the windpipe and pin-bones of the shoulder, thereby interfering with the easy movement of the horse and lessening his pulling power, I propose, in order to avoid such inconvenience and strain upon the animal, and to prevent the stretching and sagging down as above described, to construct the breast-collars as follows:

Within a covering of ordinary harness-leather, cut in any shape desired for a collar, I place a stout well made strip of enameled leather, the same being in one entire piece, and make the outer leather conform to every curve of the inner by stitching or any other known mode, so as to form a solid yet pliable collar, as in figs. 1, 2; the enameled leather serving to stay the collar, keep it in shape, and prevent its stretching and, consequently, sagging.

This combination of patent leather with the breeching leather, substantially as described, I claim to be entirely new, and to have this superior advantage over any other mode of combination yet produced, viz: that the patent leather, being within the collar, is not exposed to the varying action of heat, cold, and moisture, which would otherwise destroy the enamel and injure the texture, two properties forming the main part of its anti-stretching power.

I claim that collars constructed in this manner are superior to any now made, and combine strength with durability, ease to the horse, by preventing the pressure upon the windpipe and shoulder pin-bones, and continuity of shape with adaptability to the horse's breast.

What I claim, and desire to secure by Letters Patent, is—

The combination of an inner stay of enameled leather with an outer covering of ordinary harness-leather, substantially as and for the purpose set forth and described.

WM. E. LEONARD.

Witnesses:
EDM. F. BROWN,
HENRY F. KING.